US006443396B1

United States Patent
Berland (10) Patent No.: US 6,443,396 B1
(45) Date of Patent: Sep. 3, 2002

(54) CRUCIFORM PARACHUTE WITH ARMS ATTACHED

(75) Inventor: Jean C. Berland, Marlton, NJ (US)

(73) Assignee: Para-Flite, Inc., Pennsauken, NJ (US)

( * ) Notice: Subject to any disclaimer, the term of this patent is extended or adjusted under 35 U.S.C. 154(b) by 0 days.

(21) Appl. No.: 09/659,782

(22) Filed: Sep. 11, 2000

(51) Int. Cl.$^7$ .............................................. B64D 17/02
(52) U.S. Cl. ....................................................... 244/145
(58) Field of Search ................................ 244/141, 145, 244/152

(56) References Cited

U.S. PATENT DOCUMENTS

| | | | |
|---|---|---|---|
| 1,757,247 A | 5/1930 | Hoffman | |
| 1,834,370 A | 12/1931 | Askam | |
| 2,745,615 A | 5/1956 | Fogal | 244/145 |
| 2,770,432 A | * 11/1956 | Stevinson | |
| 2,942,817 A | 6/1960 | Utermoehlen | 244/145 |
| 2,970,795 A | 2/1961 | Gold | 244/142 |
| 2,997,263 A | * 8/1961 | Forichon | |
| 3,331,573 A | 7/1967 | Winker et al. | 244/145 |
| 3,474,990 A | * 10/1969 | Flatau | |
| 3,531,067 A | 9/1970 | Mitchell | 244/145 |
| 3,559,931 A | 2/1971 | Pohl | 244/145 |
| 3,602,462 A | * 8/1971 | Slater | 244/145 |
| 3,727,863 A | * 4/1973 | Bockelmann | 244/145 |
| 3,741,505 A | 6/1973 | Engel | 244/145 |
| 3,773,284 A | 11/1973 | Matsuo et al. | 244/142 |
| 4,778,131 A | * 10/1988 | Calianno | 244/145 |
| 4,834,323 A | 5/1989 | Reuter | 244/145 |
| 5,005,785 A | * 4/1991 | Puskas | 244/152 |
| 5,037,042 A | * 8/1991 | Calianno | 244/145 |
| 5,472,394 A | 12/1995 | Michaelson | 482/74 |
| 5,839,695 A | 11/1998 | Puskas | 244/145 |

FOREIGN PATENT DOCUMENTS

| | | | |
|---|---|---|---|
| DE | 85 30 402.6 | 3/1986 | |
| FR | 1087786 | * 12/1953 | 244/152 |

OTHER PUBLICATIONS

GQ Parachutes Ltd. brochure, GQ Supply Dropping Parachutes.
GQ brochure, Unicross Supply–Dropping Parachutes.
RFD–CQ Limited brochure, the 816 Parachute an Entirely New Shape in the Sky.

* cited by examiner

Primary Examiner—Peter M. Poon
Assistant Examiner—Kevin Jakel
(74) Attorney, Agent, or Firm—Jacobson Holman, PLLC (57) ABSTRACT

An improved cruciform or cross parachute is formed by attaching the adjacent edges of the lateral arms to each other to form a three-dimensional canopy, when inflated, which is substantially square at the top and substantially round at the lower edge. The attachment of the adjacent edges of the arms are such as to provide generally vertical openings or vents through which air can flow outwardly from underneath the canopy, which form "corner air flow jets", thus allowing use of zero or near zero porosity fabric for constructing the canopy. Attachment of the adjacent edges of the arms at their outer tips forms a continuous hem at the lower edge of the canopy which eases packing and improves reliability. Arm air flow jets of U.S. Pat. No. 5,839,695 may also be included in addition to the corner air flow jets formed by attaching the adjacent arm side edges. Air flow from underneath the canopy through the air flow jets should be sufficient to achieve a degree of flight stability for the parachute of ±5°, or less, when using a zero or near zero porosity fabric for the canopy.

27 Claims, 5 Drawing Sheets

CRUCIFORM PARACHUTE WITH ARMS ATTACHED

BACKGROUND OF THE INVENTION

1. Field of the Invention

This invention relates in general to parachutes and more specifically to cruciform or cross parachutes. The present invention is a modification of the conventional cruciform parachute design, in which the arms are connected to form a parachute canopy configuration which is substantially square at the top and round at the lower edge.

2. Description of the Prior Art

Generally speaking, there are three types of parachute designs for personnel and cargo which are deployed from airborne aircraft. First, there is the conventional generally hemispherical canopy with the suspension or rigging lines connected around a continuous circular lower edge of the canopy. Second is the ram air type parachute with upper and lower surfaces generally in the shape of an airfoil with the suspension lines connected to the bottom surface. And, finally, there is the cruciform or cross parachute in which the canopy includes a generally square crown or center section with four wings or arms attached to the four sides with the suspension or rigging lines attached along the outer edges of the arms.

Because of their simple geometric configuration, parachutes having a cruciform or cross design are notable for their simplicity in construction and therefore low cost. Examples of modern cruciform or cross parachutes are shown in the prior art, such as in U.S. Pat. Nos. 3,331,573, 3,531,067, 3,559,931, 3,741,505 and 4,834,323. A major drawback of the cruciform parachute configuration, however, is the relatively large pendulum oscillation about the vertical, on the order 10° to 15°, and other stability problems associated with this design. Efforts to overcome the oscillation and instability problems of cruciform parachutes have focused on extending the length of the arms to a length substantially greater than their width and to extending the length of the suspension lines. While these changes increase the stability and the drag coefficient of cruciform parachutes, they introduce new drawbacks, such as excess weight, bulk and costs, and the longer time constant of pendulum motion once initiated.

Furthermore, the rate of decent of a parachute can be decreased by using cloth for the canopy which has zero, or near zero, porosity. Such low porosity materials have been used in parachute design, especially in parachutes of the ram air type. However, as the porosity/permeability of the canopy fabric is decreased, stability is also decreased, and other problems such as opening shock are encountered. Thus, it has not been previously possible to utilize zero or near zero porosity materials in cruciform parachutes because the use of such materials increases the already unacceptable instability and oscillation of cruciform parachute designs.

The cruciform parachute designs of U.S. Pat. No. 5,839,695 (the "'695 patent") seek to overcome the heretofore known problems in cruciform parachutes by providing air venting or air flow jets through appropriate vents or openings placed at selected locations in the wing or arm portions of the parachute canopy. By providing the air venting jets, zero, or near zero, porosity material can be utilized for the canopy of a cruciform parachute. The air venting or air flow jets of the '695 patent are hereinafter referred to as "arm air flow jets", or more simply "arm air jets". The arm air flow jets of the '695 patent are formed by generally horizontal elongated openings located in each of the four wings or arms of the canopy near where a tangent line which intersects the canopy surface forming the arms approaches a 45° angle with the vertical axis of the parachute. This transition point is normally 15% to 30% of the arm length from where the arm is attached to the crown. Further, the arm air venting jet openings are preferably positioned centrally with respect to the width of the canopy arms.

However, the parachute design of the '695 patent does not overcome all of the problems associated with cruciform parachutes. For example, cruciform parachutes can sometimes be difficult to pack because of the four separate arms extending in different directions from the generally square crown or central section. Further, there is the problem of reliability in packing in the event one of the arms is accidentally inverted.

Other prior U.S. patents which disclose parachute configurations that may have relevance to the present invention are U.S. Pat. Nos. 1,757,247, 1,834,370, 2,745,615, 2,942,817, and 5,472,394. It is also known in cruciform parachutes that the arms have been connected to each other through tapes, lines, or ropes in order to limit the excursions of the arms relative to each other, and to prevent them from inflating inside out if inverted.

However, in such circumstances, the adjacent edges of the arms are not attached to each other so as to form a three-dimensional shape that is substantially square at the top and round at the hem or lower edge. Further, cruciform parachutes have been built in the past using multiple pieces of material tied together, which in essence leave slits in the middle of each arm. These slits are running co-axially with the suspension lines, but their purpose is not to provide venting, and are not used in combination with arms attached to each other along adjacent edges.

SUMMARY OF THE INVENTION

The primary purpose of the present invention is to overcome the problems associated with known cruciform or cross parachutes, including the cruciform parachute of the '695 patent. The improved cruciform parachute of the present invention is also made of zero, or near zero, porosity material and overcomes the stability and oscillation problems that previously plagued the cruciform parachute design.

In accordance with the present invention, a parachute of the cruciform or cross design, using zero or near zero, porosity material is modified by having the adjacent edges of the arms or wings of the parachute attached to each other while leaving generally vertical openings or vents between adjacent arm edges through which air can flow out from underneath the canopy. These openings or vents allow the higher pressure air inside the parachute canopy to escape. It has been surprisingly found that by connecting the arms together, an entirely new cruciform parachute design is created which forms a three dimensional shape upon inflation that is substantially square at the top and substantially round or circular at the hem or lower edge.

Further, it has been found in accordance with the present invention that the air jets necessary for a cruciform or cross parachute of zero, or near zero, porosity material can be formed at the connection of the arms where their adjacent edges are attached, and not preferably in the central portions of the arms as in the '695 patent. Hence, in accordance with the present invention, air flow jets are formed below each corner of the generally square crown of the parachute. For the purpose of this invention, these air flow jets are referred to as "corner air flow jets", or more simply, "corner air jets".

Also, in accordance with the present invention, the corner air jets can be formed by one or more generally vertical openings.

In addition, this new cruciform parachute configuration has the advantage of a continuous hem at the lower edge of the canopy. This continuous hem eases packing of the cruciform parachute configuration and improves reliability since accidentally inverting the arms during packing becomes impossible.

The size of the generally square crown or central portion of the canopy, the length of the lateral arms and the length of the suspension lines are designed so as to provide the desired stability and rate of decent using the zero, or near zero, porosity material whether for personnel or cargo use of the parachute. Shorter arm length and shorter suspension lines length than in conventional prior cross parachute designs can also be used in the present invention, without sacrificing stability, thus reducing the bulk and cost of the parachute.

In one embodiment of the present invention, the arms of the cruciform parachute are attached along their adjacent edges at vertically spaced locations to create a series of generally vertical openings at the four corners of the canopy. This series of vertical openings allows the high pressure air from underneath the canopy to escape. The forming of such corner air jets at the interconnection of adjacent edges of the arms of the parachute reduces the number and/or size of the generally horizontal arm air jets as described in the '695 patent.

In a second embodiment, the bottom portion of the interconnected arm edges is attached continuously for a specified length of the side edges, leaving a single large opening or corner air jet between the upper side edges at each of the four corners of the canopy. In this embodiment, a majority of the side edges are left unattached, preferably, in the range of 60% to 85%. A single arm air jet can be included.

In a third embodiment, the arm edges are interconnected in a manner similar to the second embodiment, with a single large opening or corner air jet between the upper side edges at each of the four corners of the canopy, but the arm air jets are eliminated. In this embodiment, sufficient venting is obtained from the large openings, or corner air jets, to eliminate the need for additional venting from any arm air jets. This significantly simplifies the construction even further since the only addition to the conventional cruciform parachute construction is the interconnection of the arm edges for a specified length of the side edges from the hem or outer edges of the arms. There is no need for attaching additional reinforcing tapes, such as necessary for the arm air jets of the '695 patent, because the side edges of the arms already have reinforcing tapes. It is therefore only necessary to attach the edges along their reinforcing tapes.

It is therefore an object of the present invention to provide a parachute of the cruciform or cross configuration type in which adjacent edges of the arms of the parachute are attached to each other while leaving generally vertical openings or vents through which air can flow out from underneath the canopy.

It is a further object of the present invention to provide a cruciform or cross configuration parachute in accordance with the preceding object which has a continuous hem or lower edge.

It is yet a further object of the present invention to provide a cruciform or cross configuration parachute in accordance with the preceding objects which has a new three dimensional shape that is substantially square at the top and substantially round at the lower edge or hem.

It is another object of the present invention to provide a cruciform parachute made from zero or near zero porosity fabric which has increased stability and reduced oscillation by providing corner air flow jets or openings in the connection between the adjacent side edges of the arms or wings of the canopy.

It is a still further object of the present invention to provide a cruciform parachute which can be more easily packed and with improved reliability because accidentally inverting the arms during packing becomes impossible.

It is yet another object of the present invention to provide a cruciform parachute wherein canopy sizes of from twenty up to sixty feet in diameter, when fully deployed, are capable of usage for air delivery of personnel.

It is a further object of the present invention to provide a cruciform parachute wherein canopy sizes of from 6 inches up to 15 feet in diameter are capable of usage for the air delivery of non-personnel payloads such as weapons and detection devices such as antitank mines and the like.

It is a still further object of the present invention to provide a cruciform parachute wherein usage with air delivery craft having higher air speed is possible without decreasing the stability of the delivery parachute.

Further still, it is another object of the present invention to provide cruciform parachute configurations which can be manufactured at lower cost with lower bulk, by reducing the arm and suspension line length in relation to the crown or center section.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS OF PREFERRED EMBODIMENTS

DESCRIPTION OF THE PREFERRED EMBODIMENTS

Although only three preferred embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 3:
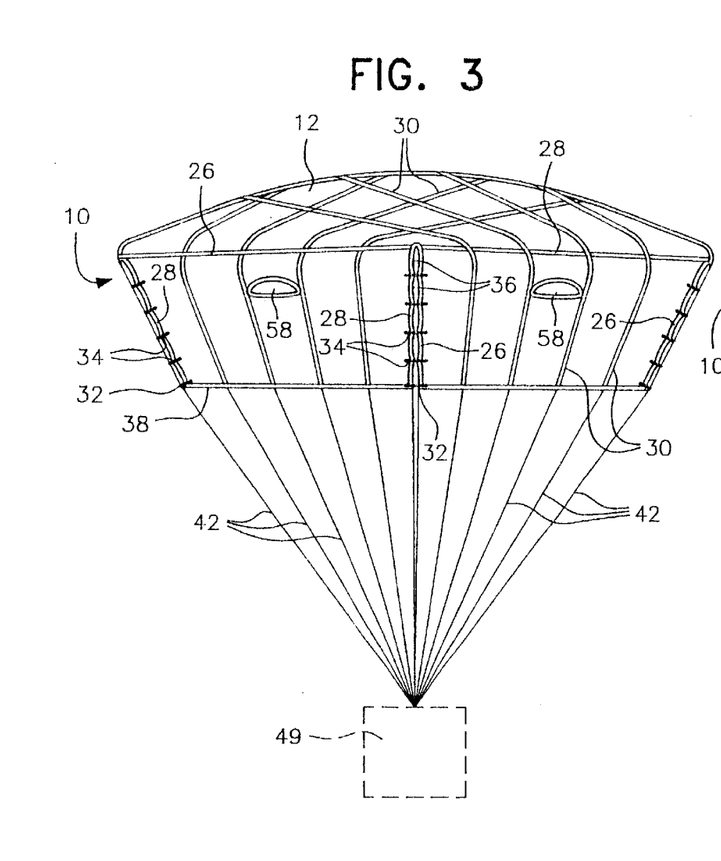
FIG. 3 is a side view of the canopy configuration shown in FIG. 1 illustrating the interconnection of the adjacent side edges of the canopy arms.
Figure 4:
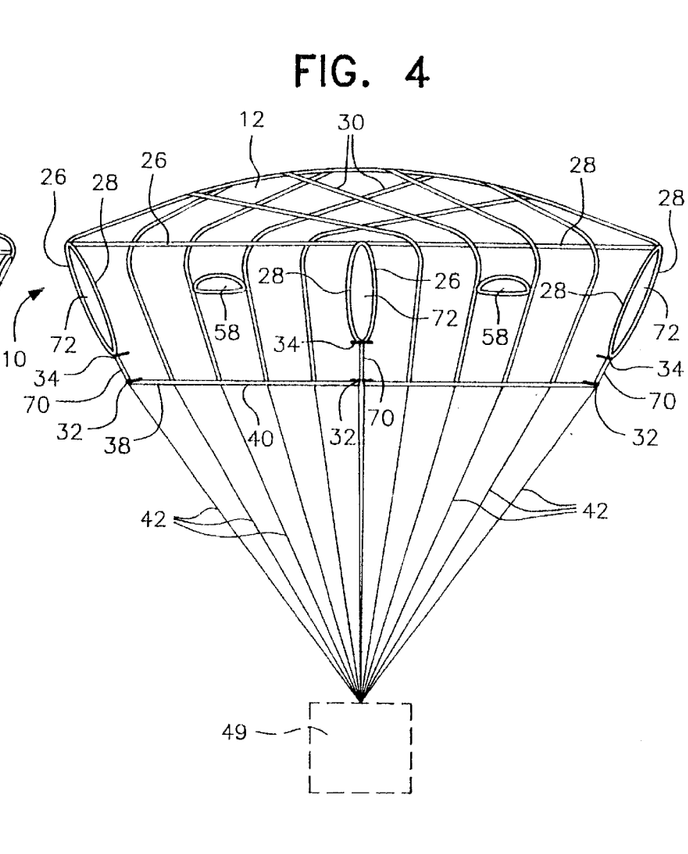
FIG. 4 is a side view, similar to FIG. 3, showing an alternate attachment arrangement for the adjacent side edges of the arms of the canopy.
Figure 5:
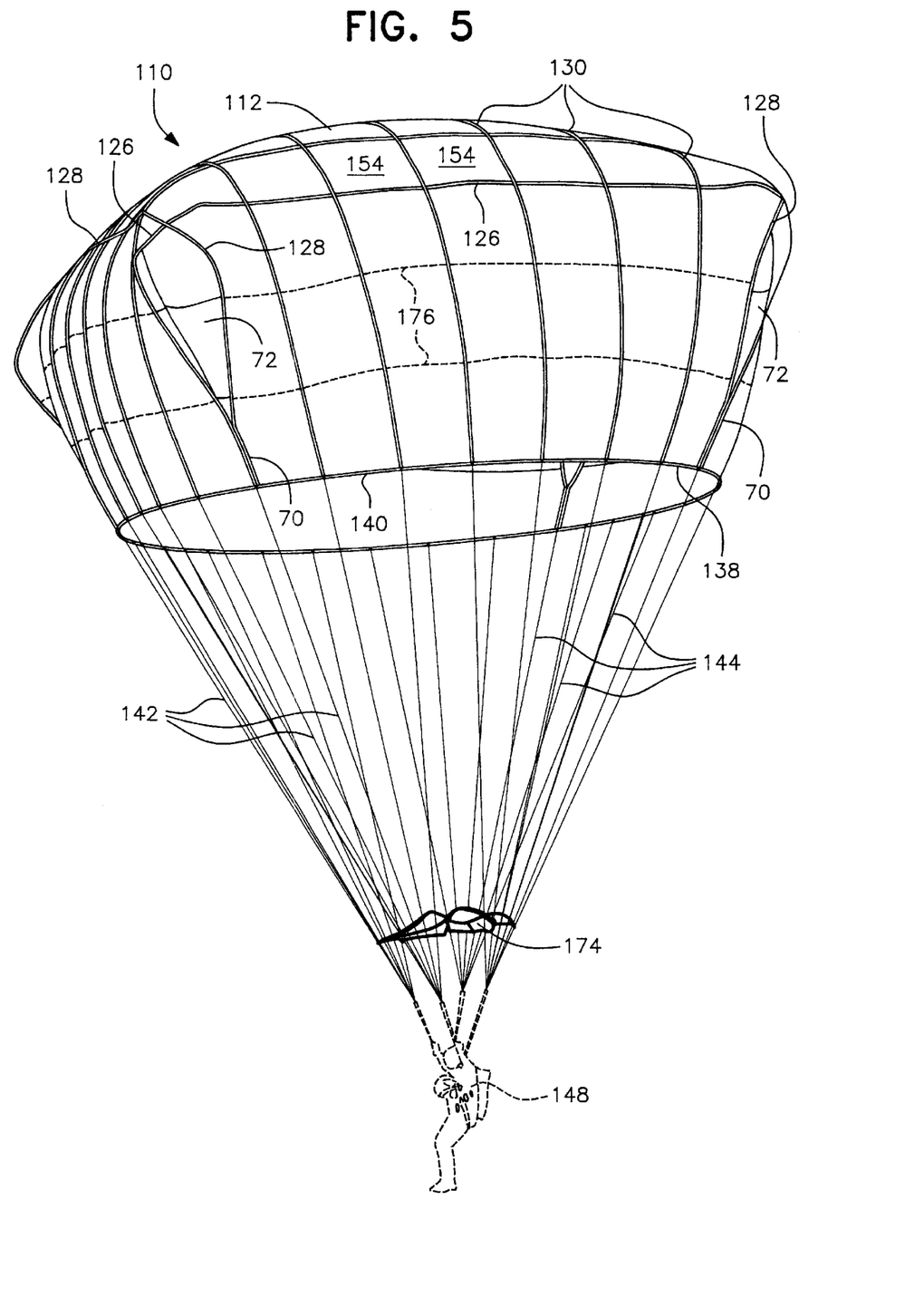
FIG. 5 is a perspective view of a further embodiment of a deployed cruciform parachute constructed in accordance with the present invention.
Figure 6:
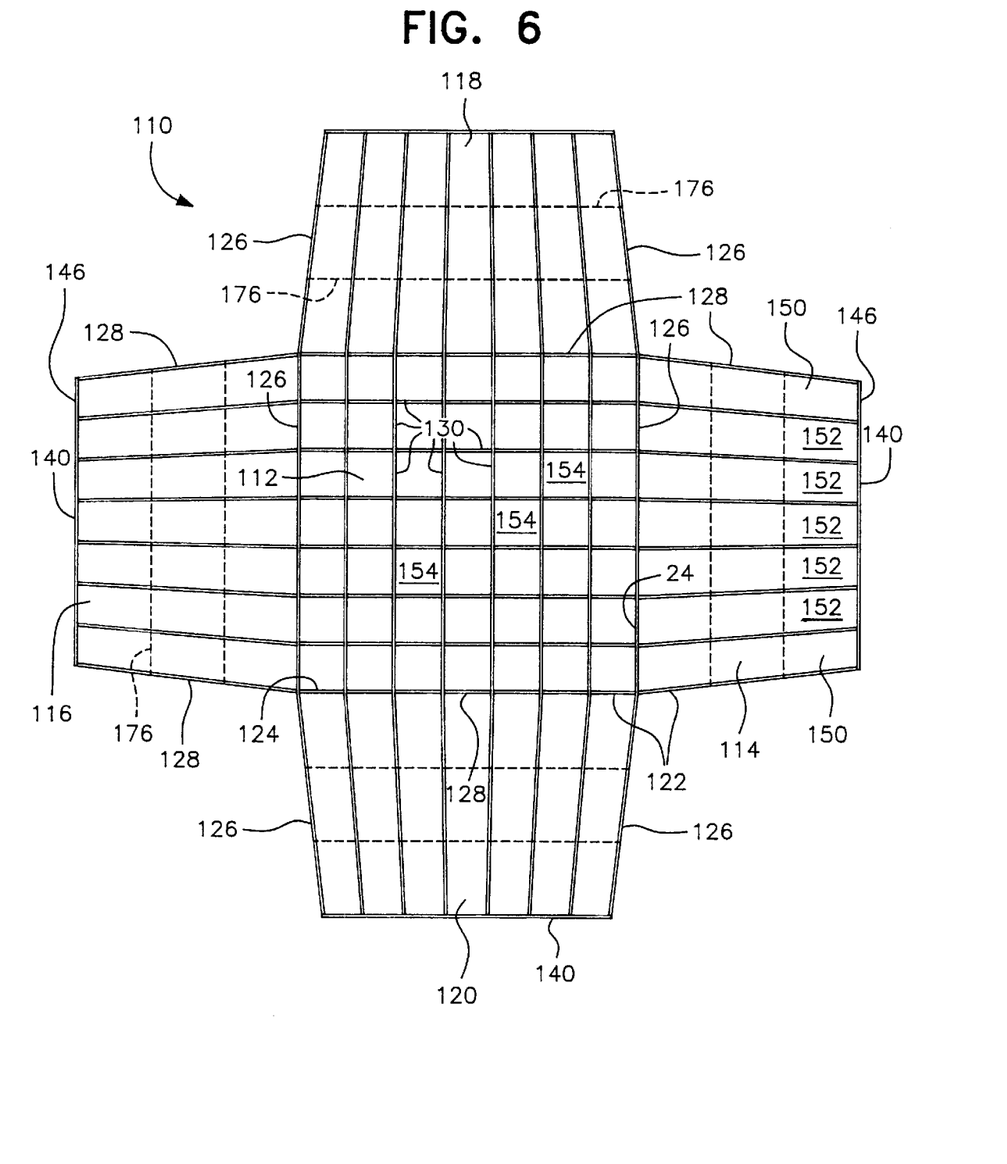
FIG. 6 is a plan view of the canopy of FIG. 5 laying flat, without suspension lines attached.

As shown in the drawings, the parachute of this invention has a canopy of cruciform or cross shape generally designated by reference numeral 10 in FIGS. 1–4 and by reference numeral 110 in FIGS. 5–6. In FIGS. 1–4, the canopy 10 includes a substantially square crown or central section 12 and four laterally extending wings or arms 14, 16, 18, and 20. Each lateral arm is attached at its uppermost edge 22 to one side edge 24 of the crown 12, preferably with edge reinforcing tapes 26 and 28 which extend continuously along the seam between edges 22 and 24 and along the edges of adjacent arms. Thus, as shown in FIGS. 1–4, edge reinforcing tape 26 extends from the outer tip of arm 20 continuously along its two side edges across the seam between edge 22 and 24 and then continuously along the side edges of arm 18 to its outermost tip. Similarly, edge reinforcing tape 28 extends from the outer tip of arm 14 along its two side edges through the seam between edge 22 of arm 20 and edge 24 of central section 12 and then across along the outer edges of arm 16. Internal reinforcing tapes 30, or the like, extend continuously across the arms and the crown to further reinforce the canopy. The reinforcing tapes 26, 28 and 30 of the present invention are of conventional design well known in the parachute art.

Figure 1:
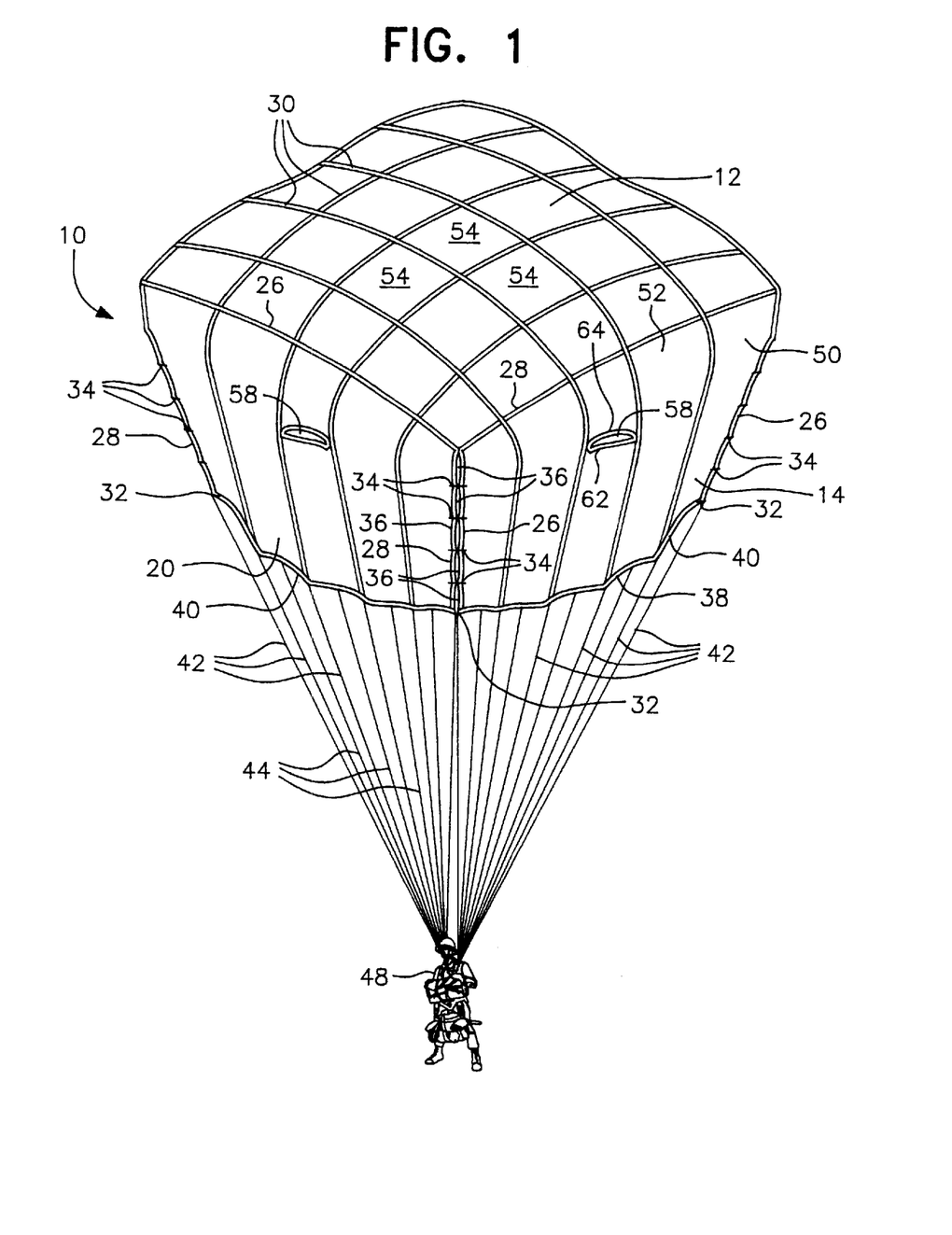
FIG. 1 is a perspective view of a deployed cruciform parachute constructed in accordance with the present invention.

In contrast to prior cruciform parachute designs, the cruciform parachute shown in FIG. 1 has the adjacent side edges defined by reinforcing tapes 26 and 28 of each of the arms 14, 16, 18 and 20 interconnected at the bottom, as indicated by the numeral 32, and at spaced locations along the side edge tapes 26 and 28, as indicated by the numeral 34. As shown in FIGS. 1 and 3, there are four intermediate attachment points 34, in addition to the lower edge attachment point 32 along each interconnection of the arms. By attaching the arms in this manner, the openings 36 formed between the attachments 32 and 34 form generally vertical air flow jets. As such, air flow jets 36 are equally spaced at each of the four corners of the crown 12 along the attachment of adjacent edges of the arms 14, 16, 18 and 20, thus the term "corner air flow jets" or "corner air jets".

Further, the attachment 32 at the outer corners of the adjacent arm edges causes the outer edges of the arms 14, 16, 18 and 20 to form a continuous hem or lower edge 38. The hem or lower edge 38 of the canopy 10 is reinforced with reinforcing tapes, indicated by numeral 40, as known in the industry. Then, when inflated, the canopy 10 of the present invention assumes a unique three dimensional shape. The top defined by the crown 12 is substantially square whereas the hem or lower edge 38 is substantially round or circular.

Suspension lines 42 and 44 are attached at their uppermost ends to the canopy 10 at the lower edge 38 defined by the outer edges of arms 14, 16, 18 and 20. The suspension lines are attached to the lower edge 38 at the location of the reinforcing tapes 26, 28 and 30 by any suitable connection such as by forming loops at the ends of the reinforcing tapes in a known manner. As shown in FIG. 1, suspension lines 42 are attached to the lower edge 38 of arms 14 and 20, whereas suspension lines 44 are attached to lower edge 38 of arms 16 and 18 (not shown). The lowermost ends of the suspension lines 42 and 44 are then connected to the parachutists 48 (in FIG. 1) through any suitable rigging in known conventional equipment. A generic load 49 is shown in dotted lines in FIGS. 3 and 4.

Figure 2:
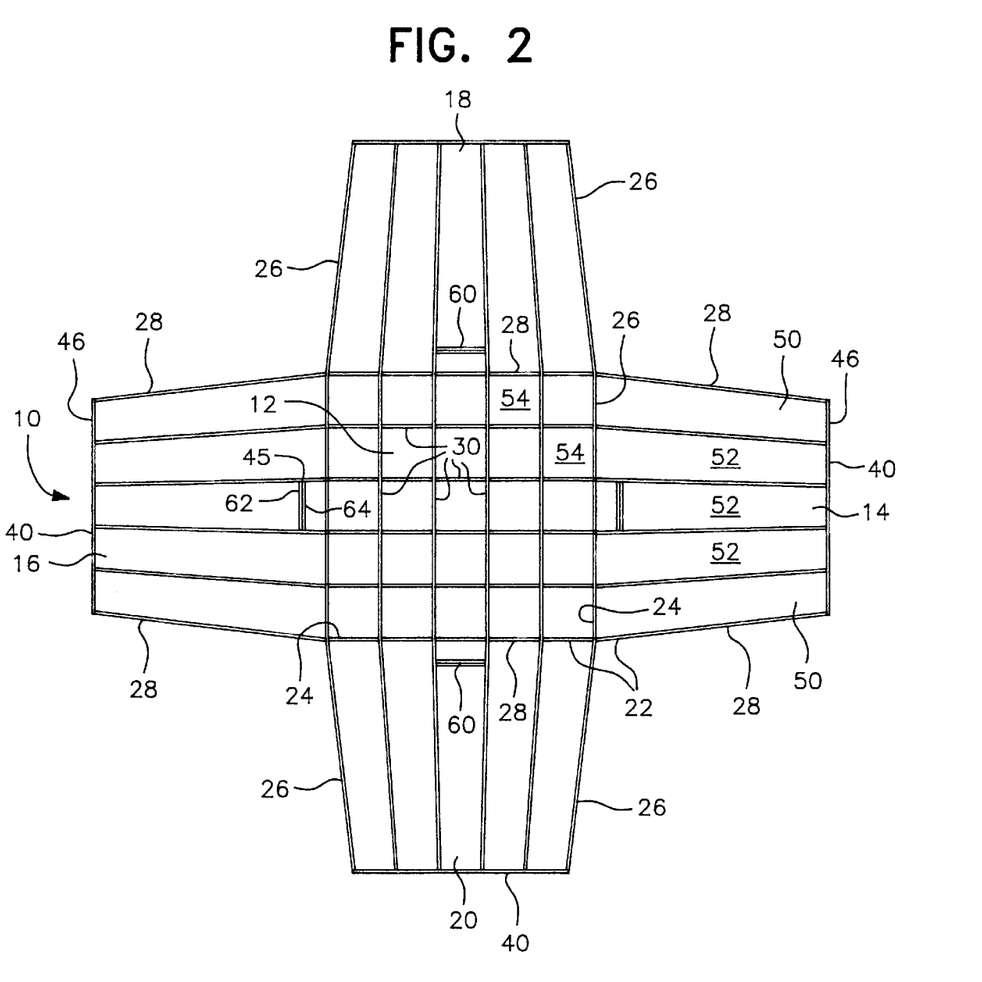
FIG. 2 is a plan view of the canopy of FIG. 1 laying flat, without suspension lines attached.

In the form of the invention as shown in FIGS. 1, 2 and 3 of the drawings, internal and external reinforcing tapes 26, 28 and 30 divide each arm 14, 16, 18 and 20 into five elongated panel sections, two side edge panels 50 and three interior panels 52. Similarly, tapes 26, 28 and 30 divide the generally square crown central section into twenty-five approximately equal, generally square panel sections 54. As shown in FIG. 2, panels 50 and 52 of arms 14, 16, 18 and 20 are all tapered along their length toward their outer edge 40. By this configuration excess fabric can be eliminated and the design of the arms with reinforcing tapes matches the convergence of the suspension lines to a common confluence point.

As stated previously, the canopy of the present invention preferably uses zero or near zero porosity fabric. While such fabric permeability increases the drag coefficient and, therefore, the efficiency of the canopy because there is less venting through the fabric, the instability of the parachute due to its cross form configuration is increased. The corner air flow jets 36 serve to overcome the negative effects of the zero, or near zero, fabric permeability. In addition, arm air flow jets generally designated by the numeral 58 in accordance with the '695 patent can be built into each canopy arm 14, 16, 18 and 20. The arm air flow jets 58 are provided by generally horizontal openings 60 in the upper portion of each arm near its intersection to the adjacent side edge of the square center section 12. In their preferred form, the arm air jets 58 are formed by slits 60. The slits 60 are preferably reinforced along their leading edges by reinforcing tapes 62 and 64, or the like, which are connected at their ends and intersect with internal reinforcing tapes 30, such as at 66.

The arm air jets 58 are most preferably positioned on arms 14, 16, 18 and 20 at the location where a line which is tangent to the surface of the arm approaches a 45° angle with the vertical axis of the parachute. In most cruciform designs in accordance with the present invention, this transition point is about 15% to about 30% of the arm length from the edge 22. While slits, without removing any fabric from the internal panels 52 of each arm, are clearly preferred for forming the arm air jet vents 58, it may be possible to form the arm air jets by cutting holes or slots that have a measurable area.

Typical dimensions for the components of a parachute manufactured in accordance with the present invention as shown in FIGS. 1, 2 and 3, with manufacturing tolerances within + or –2%, are as follows. Each side 24 of crown 12 measures 242.5 inches, thus making each substantially square panel section 54 about 48.5 inches on each side, and the area of the crown approximately 408 square feet. The length of the uppermost edge 22 of canopy arms 14, 16, 18 and 20 is therefore also 242.5 inches, and the uppermost edge of each panel section 50 and 52 about 48.5 inches. The length of each canopy arm from the uppermost edge 22 to the outermost edge 40 is 110 inches, or approximately 45% of side 24, and each panel 50 and 52 is reduced in width from 48.5 inches to 36 inches along its outermost edge. The five vertical side openings 36 along the interconnection of the arms 14, 16, 18 and 20 are each about twenty-two inches in height, expanding to about 5–6 inches in width when the canopy is fully inflated. The arm air flow jets 58 are positioned about twenty-four inches away from the uppermost edges 22 of the canopy arms. Finally, the suspension lines 42, 44 are approximately 285 inches in length, or approximately 62% of the canopy cross panel length.

An alternate canopy configuration in accordance with the present invention is shown in FIG. 4 where like numerals are used to identify the same components described above for canopy 10 as shown in FIGS. 1, 2 and 3. The major difference in the canopy configurations is the attachment of the adjacent edges of the arms 14, 16, 18 and 20 along reinforcing tapes 26 and 28. More specifically, the side edges of the arms from the lowermost attachment 32 along the lower edge or hem 38 of the canopy to attachment 34 is fully connected by stitching and reinforcing tape 70, or other type attaching. The upper portion of the adjacent side edges defined by reinforcing tapes 26 and 28 is left open to form a single generally vertical corner air flow jet 72 over a major portion of the length of the side of each arm 14, 16, 18 and 20. A single arm air flow jet 58 also can be included in the central panel section 52 in the upper section of each arm, similar to the embodiment illustrated in FIGS. 1, 2 and 3.

In the embodiments of FIGS. 1–4, it has been found that a single arm air jet 58 in the central panel 52 of each arm 14, 16, 18 and 20 is sufficient in combination with the corner air jets 36 or 72 to overcome the instability arising from using the zero, or near zero, permeability fabric. The canopies of the present invention also exhibit a zero percent geometric porosity because no fabric has been removed in forming the arm air jets 58 through slits 60 or in forming the corner air jets 36 or 72.

Another, and perhaps preferred, canopy configuration in accordance with the present invention is shown in FIGS. 5 and 6 where like numerals in the 100 series are used to identify the same components described above for canopy 10 as shown in FIGS. 1–4. For example, the number 112 identifies the crown and numerals 114, 116, 118 and 120 identify the arms, for the canopy 110 shown in FIGS. 5 and 6, which correspond to the crown 12 and arms 14, 16, 18 and 20 of the canopy 10 shown in the FIGS. 1–4 embodiments. The canopy 110 differs from the canopy 10 of the embodiments shown in FIGS. 1–4 by the omission of the arm air jets 58. It has been found that if the corner air flow jet or opening 72 is properly sized, the inclusion of arm flow jets may not be necessary for the cruciform or cross parachute canopy of the present invention.

The canopy configuration shown in FIGS. 5 and 6 also differs from the embodiments shown in FIGS. 1–4 in that the internal and external reinforcing tapes 126, 128 and 139 divide each arm 14, 16, 18 and 20 into seven elongated panel sections, two side edge panels 150 and five interior panels 152. Similarly, the tapes 126, 128 and 130 divide the generally square crown central section into 49 approximately equal, generally square panel sections 154. As shown in FIG. 6, panels 150 and 152 of arms 114, 116, 118 and 120 are also tapered along their length toward their outer edge 140 so as to eliminate excess fabric and match the design of the arms to the convergence of the suspension lines to a common confluence point.

In addition, the parachute of the FIGS. 5 and 6 configuration preferably includes a slider 174. While the canopy of the present invention can still be deployed without a slider type reefing device, the slider 174 is preferably used in this embodiment as a means for managing the greater number of suspension lines and the skirt or hem 138. Hence, the slider 174 serves to improve reliability, rather than simply as a reefing device. Canopy 110 also includes internal reinforcing tapes 176 which serve to reinforce the arms 114, 116, 118 and 120 and their panels 150 and 152 in the crosswise direction. The tapes 176 help to retain the shape of the canopy in the transition from a substantially square crown or top 112 to a generally circular lower edge, skirt or hem 138.

Typical dimensions for a parachute manufactured in accordance with the present invention as shown in FIGS. 5 and 6, with manufacturing tolerances within + or −2%, are as follows. Each side 124 of crown 112 measures 25 feet, or 300 inches, and each substantially square panel section 154 is about 42.857 inches on each side. The area of the crown 112 is approximately 625 square feet. The length of the uppermost edge 122 of canopy arms 114, 116, 118 and 120 is also 300 inches, and the uppermost edge of each panel section 150 and 152 is also about 42.857 inches. The length of each canopy arm from the uppermost edge 122 to the outermost edge 140 is 132 inches, or approximately 44% of side 124, and each panel 150 and 152 is reduced in width from 42.857 inches to 29.515 inches along its outermost edge. The stitching and reinforcing tape 170 which fully connects the side edges of the arms upwardly from the lower edge or hem 138 extends for approximately 30 inches, thus producing corner air jets or openings 172 which are approximately 50 square feet at full deployment and during flight of the parachute. Finally, the suspension lines 142, 144 are approximately 21 feet in length, or approximately 45% of the canopy cross panel length.

As discussed previously, the canopies of the present invention including the crown section and the four arms are preferably made from a zero, or near zero, porosity fabric. Fabrics that have a permeability of less than 5 SCFM/square foot at ½ inch of water pressure are best suited for the present invention. The fabric for the crown and the arms may be of the same material or the crown can be made from a zero porosity fabric and the arms made from an ultra low permeability fabric. A conventional zero porosity fabric for parachutes is coated with a mixture of polyurethane and silicone and readily available commercially from parachute fabric supplies, such as the "Soar Coat" fabric sold by Performance Textiles of Greensboro, N.C. The specifications for the Performance Textiles "Soar Coat" zero porosity fabric state that it has zero porosity at a differential pressure of 10 inches of water column. A fabric suitable for the arms of the present invention is referred to as the "F-111" type and is presently available from several sources, including Performance Textiles, and Brookwood Companies, Inc. of New York, N.Y. It is defined in U.S. military specification, MIL-SPECMIL-C-44378. The F-111 type fabric is specified to have a permeability between zero to 5 SCFM at ½ inch water pressure.

Combining a zero, or near zero, porosity fabric material for the canopy 10 or 110 together with an air flow jet venting system in accordance with the present invention, provides improved performance for the cruciform parachute configuration. The corner flow jets 36, 72 and 172 tend to cause the vented air to move in an outward and downward direction as the air is forced outwardly from underneath the crown section of the canopy. Directing the air flow which collects underneath the crown section of the canopy in an outwardly and downwardly direction, as opposed to upwardly through the fabric towards the sky, provides propulsive benefits, which tend to reduce the rate of descent of the canopy. Further, directing this air flow outwardly and downwardly along the outer surface of the canopy also increases the effective drag area of the parachute by forcing air flowing around the parachute during descent to flow around the energetic outflow from the openings.

In terms of performance, a zero porosity fabric for the crown of the canopy is better than a near zero porosity fabric. However, present day zero porosity fabric are more costly than near zero porosity fabrics and are also heavier. Accordingly, at the present time, near zero porosity fabric for both the crown and the arms is preferred, primarily for economic reasons.

While the illustrated embodiments divide each arm into five or seven elongated panel sections, this feature should in no way be limiting for the present invention since fewer or more panel sections can be built into the parachute of this invention by utilizing additional internal reinforcing tapes 30, 130 or the like. The number of reinforcing tapes 30, 130 and interior panel sections 52, 152 depends in great part on the size of the parachute, the reinforcement desired and the number of suspension lines and suspension line attachment points to be built into the canopy. The same applies to the number of generally square panel sections 54, 154 for the crown. While it is preferred that the crown or center section 12, 112 be constructed of a single piece of fabric and divided into sections by reinforcing tapes, it is possible to form the crown by stitching individual panel sections together, using reinforcing tape in a known manner. Further, while definitely not preferred, it may be possible to use more or less internal reinforcing tapes 30, 130 in one direction, with less or more reinforcing tapes in the other direction, without departing from the present invention.

Opening shock associated with the opening of the parachute during deployment can be controlled in accordance with the present invention, despite the fact that zero, or near zero, porosity fabric is used for the canopy construction. Control of the opening shock is essential for personnel use and can be controlled in accordance with the present invention by varying the length and width of the lateral arms and length of the suspension lines, without having to resort to extra reefing systems such as sliders or the like. Therefore, in accordance with the present invention, the length of the lateral arms compared to their width is substantially less than in prior art cruciform canopy designs. Similarly the suspension lines are also significantly shorter than in conventional cruciform canopy designs.

As described above and shown in FIGS. 2, 3, 4 and 6 of the drawings, the vertical extent or length of the canopy arms is substantially less than their uppermost width which generally conforms to the adjacent side of the square crown. This is unlike conventional cruciform canopy designs to which the canopy arms typically have a length of 100% to 150% of the crown width. Moreover, it is preferred in the present invention that the length of the canopy arms be less than 75% and, most preferably, on the order of 40–60% of the canopy crown width. In addition, the suspension lines in the present invention are substantially shorter than suspension lines typically used in conventional cruciform parachutes. More specifically, the suspension lines in the parachute of the present invention have a length which is substantially less than the length of the canopy cross panels, measured from the outer edges 40 of opposed canopy arms, tip-to-tip, such as the outer edge on arm 14 to the outer edge on arm 16. Preferably, the suspension lines have a length which is 40%–70% of the canopy cross panel length rather than the 100% to 150% used in the prior art. In addition, the suspension line material is made from polyester, instead of the conventional nylon, to reduce differential stretching.

In accordance with the present invention, the volume of air flow from underneath the canopy through the corner air flow jets 36, 72 or 172, and the arm air flow jets 58, if included, should be equivalent to a geometric porosity for the canopy of about 3% to about 5%. When using zero or near zero porosity fabric, the volume of air flow should be sufficient to achieve a degree of flight stability to the parachute of ±5°, or less; in other words, the pendulum oscillation should be no more than ±5°.

Furthermore, while zero or near zero porosity fabric material for the canopy is preferred for the cruciform or cross parachute of the present invention, other materials such as low porosity fabric may also be used. However, the present invention is not applicable to permeable fabrics such as untreated cloth fabric typically used in conventional cruciform or cross parachutes. For the present invention, the fabric of the crown 12 should have a permeability of no more than about 20 SCFM/square foot at one-half inch of water pressure, and the fabric of the arms 14, 16, 18 and 20 should have a permeability of no more than about 20 SCFM/square foot at one-half inch of water pressure.

It will be noted that the parachute configurations of the present invention, especially the configuration of FIGS. 5 and 6, offer significant benefits by the simplicity of their design. The manufacturing advantages of a cruciform parachute can be employed while at the same time producing a parachute that has the advantages of a continuous hem or lower edge and a substantially round or circular lower edge when inflated. Furthermore, these benefits and advantages are obtained by minimal modification of the conventional cruciform parachute configuration by simply stitching or otherwise attaching the reinforcing tapes along the edges of adjacent sides of the arms while leaving openings for the requisite corner air jets.

The foregoing description should be considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention presented.

What is claimed as new is as follows:

1. A canopy for a cruciform parachute comprising a cruciform planform shape having a generally square central section and four lateral arms each attached to a side of said central section and extending therefrom to a generally straight outer edge; said central section and said arms both made from a zero or near zero porosity fabric; each said arm being attached directly to its adjacent arms at a location along adjacent side edges of said arms which form at least one unobstructed opening between each pair of side edges for venting air outwardly from underneath said canopy.

2. A canopy in accordance with claim 1, wherein said side edges are attached adjacent an outer edge of said arms to form a continuous lower edge to said canopy.

3. A canopy in accordance with claim 2, wherein said canopy has a three dimensional shape, when inflated, which is substantially square at its top and substantially round at its lower edge.

4. A canopy in accordance with claim 1, wherein said arms each include a further unobstructed opening in an upper central portion thereof for additional venting of air outwardly from underneath said canopy.

5. A canopy in accordance with claim 4, wherein said openings between said side edges and said openings in said arms have approximately zero geometric porosity.

6. A canopy in accordance with claim 1, wherein said unobstructed openings are generally vertical.

7. A canopy in accordance with claim 1 and further including canopy reinforcing tapes on said central section and lateral arms which are continuous and extend from the outer edge of each lateral arm, across the center section and to the outer edge of the opposite lateral arm, including reinforcing tapes along said adjacent side edges; and said side attachments connected between said side edge reinforcing tapes.

8. A canopy in accordance with claim 1, wherein said generally square central section includes four side edges and four lateral arms each having an outer edge substantially parallel to the side edge to which said arm is attached when said canopy is flat.

9. A cruciform parachute which comprises a canopy having a generally square central section with four side edges and four corners and four lateral arms attached to said side edges between said corners with each lateral arm having an outer edge substantially parallel to the side edge to which said arm is attached when said canopy is flat, and a series of suspension lines attached at said arm outer edges for connection to a load deployed with said parachute, each of said arms being attached to its adjacent arms along adjacent side edges to form unobstructed openings between said side edges for directing air flow outwardly from underneath the canopy.

10. A cruciform parachute in accordance with claim 9 and further including canopy reinforcing tapes which are continuous and extend from the outer edge of each lateral arm of said canopy, across the center section and to the outer edge of the opposite lateral arm; said suspension lines attached at said outer edges at locations of said reinforcing tapes.

11. A cruciform parachute in accordance with claim 9, wherein said lateral arms taper from their attachment to the central section sides to said outer edges.

12. A cruciform parachute in accordance with claim 9, wherein said attached side edges form a plurality of generally vertical unobstructed openings between said adjacent arms.

13. A cruciform parachute in accordance with claim 9, wherein said attached side edges are continuous for a distance from said arm outer edges and form a single unobstructed opening between said adjacent arms.

14. A cruciform parachute in accordance with claim 9, wherein said openings between said side edges direct said air flow outwardly from underneath the canopy adjacent said corners.

15. A cruciform parachute in accordance with claim 9 and further including a slider interconnecting said suspension lines.

16. A cruciform parachute in accordance with claim 9, wherein said generally square central section and said four lateral arms are both made from a zero or near zero porosity fabric.

17. A cruciform parachute which comprises a cruciform planform shape canopy having a generally square center section and four lateral arms attached thereto with outer edges defining the ends thereof, canopy reinforcing tapes extending from the outer edge of each lateral arm, across the center section and to the outer edge of the opposite lateral arm, said reinforcing tapes extending along each side edge and each outer edge of each lateral arm, said reinforcing tapes of adjacent side edges being attached to cause the outer edges of said lateral arms to form a continuous lower edge to said canopy, and suspension lines connected to said canopy reinforcing tapes at said canopy continuous lower edge.

18. A cruciform parachute in accordance with claim 17, wherein said attachments form unobstructed openings between said side edges for directing air flow outwardly from underneath the canopy.

19. A cruciform parachute in accordance with claim 17, wherein said canopy has a three dimensional shape, when inflated, which is substantially square at its top and substantially round at its lower edge.

20. A cruciform parachute in accordance with claim 17 and further including a slider interconnecting said suspension lines.

21. A cruciform parachute in accordance with claim 17, wherein said generally square central section and said four lateral arms are both made from a zero or near zero porosity fabric.

22. A canopy for a cruciform parachute comprising a central section with four substantially equal sides and four lateral arms attached one to each of said central section sides; said lateral arms having an outer edge which is substantially parallel to said central section side to which it is attached, when said canopy is flat; said arms each having a pair of opposite side edges with adjacent side edges of said arms being attached at a location along said side edges to form a canopy having a three dimensional shape, when inflated, which is substantially square at its top and substantially round at its lower edge as formed by said arm outer edges.

23. A canopy in accordance with claim 22, wherein said side edges are attached to form a continuous lower edge to said canopy.

24. A canopy in accordance with claim 22, wherein said side edge attachments form unobstructed openings between said side edges for directing air flow outwardly from underneath the canopy.

25. A canopy in accordance with claim 24, wherein said attached side edges are continuous for a distance from said arm outer edges and form a single unobstructed opening between said adjacent arms.

26. A canopy in accordance with claim 22, wherein said attached side edges form a plurality of generally vertical unobstructed openings between said adjacent arms.

27. A cruciform parachute in accordance with claim 22, wherein said generally square central section and said four lateral arms are both made from a zero or near zero porosity fabric.

* * * * *